(12) United States Patent
Mousseau et al.

(10) Patent No.: US 7,526,313 B2
(45) Date of Patent: *Apr. 28, 2009

(54) SEAMLESS CALL SWITCHING IN A DUAL MODE ENVIRONMENT

(75) Inventors: Gary P. Mousseau, Waterloo (CA); Christopher R. Wormald, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 52 days.

This patent is subject to a terminal disclaimer.

(21) Appl. No.: 11/669,777

(22) Filed: Jan. 31, 2007

(65) Prior Publication Data

US 2008/0132228 A1    Jun. 5, 2008

Related U.S. Application Data

(63) Continuation of application No. 10/992,934, filed on Nov. 19, 2004, now Pat. No. 7,187,923.

(51) Int. Cl.
*H04M 1/00* (2006.01)

(52) U.S. Cl. .............. 455/552.1; 455/553.1; 455/416; 455/432.1; 455/436

(58) Field of Classification Search .............. 455/416, 455/432.2, 436, 553.1, 432.1, 67.13
See application file for complete search history.

(56) References Cited

U.S. PATENT DOCUMENTS

| 5,815,562 | A | 9/1998 | Iglehart et al. |
| 6,243,581 | B1 | 6/2001 | Jawanda |
| 6,393,261 | B1 | 5/2002 | Lewis |

(Continued)

FOREIGN PATENT DOCUMENTS

CA    2398185 A1    7/2002

(Continued)

OTHER PUBLICATIONS

PCT Search Report and Written Opinion for Application # PCT/CA2004/001996, Nov. 19, 2004.

(Continued)

*Primary Examiner*—Temica M. Beamer
(74) *Attorney, Agent, or Firm*—John J. Oskorep, Esq.

(57) ABSTRACT

Methods and apparatus for providing a seamless switching of voice calls between different wireless networks are disclosed. In one illustrative example, a mobile communication device has a processor and one or more wireless transceivers coupled to the processor. The one or more wireless transceivers include a first transceiver portion operative in accordance with a first wireless network (e.g. a GSM/GPRS cellular network) and a second transceiver portion operative in accordance with a second wireless network (e.g. an 802.11 wireless network). A voice call is maintained between the mobile device and a communication terminal through call control equipment. The processor of the mobile device is operative to maintain voice communications for the voice call over a traffic channel established between the mobile device and the first wireless network using the first transceiver portion; cause a connecting call to be established with the communication terminal through the call control equipment in response to a predetermined condition, where the connecting call involves a traffic channel established between the second wireless network and the mobile device using the second transceiver portion; and after the connecting call is established, maintain voice communications for the voice call over the traffic channel established between the second wireless network and the mobile device.

20 Claims, 10 Drawing Sheets

U.S. PATENT DOCUMENTS

| | | |
|---|---|---|
| 6,904,029 B2 | 6/2005 | Fors et al. |
| 2002/0136226 A1 | 9/2002 | Christoffel et al. |
| 2002/0191575 A1 | 12/2002 | Kalavande et al. |
| 2003/0134650 A1 | 7/2003 | Sundar et al. |
| 2004/0109472 A1 | 6/2004 | Choyi et al. |
| 2004/0127208 A1 | 7/2004 | Nair et al. |
| 2004/0170191 A1 | 9/2004 | Guo et al. |
| 2004/0199637 A1 | 10/2004 | Li et al. |
| 2004/0218575 A1 | 11/2004 | Ibe et al. |
| 2005/0070288 A1 | 3/2005 | Belkin et al. |
| 2005/0096024 A1 | 5/2005 | Bicker et al. |
| 2005/0107086 A1 | 5/2005 | Tell et al. |
| 2005/0197156 A1 | 9/2005 | Fourquin et al. |
| 2005/0282543 A1 | 12/2005 | Idnami et al. |
| 2006/0126562 A1 | 6/2006 | Liu |
| 2006/0291419 A1 | 12/2006 | McConnell et al. |

FOREIGN PATENT DOCUMENTS

| | | |
|---|---|---|
| EP | 0700227 A2 | 3/1996 |
| EP | 1596564 A2 | 11/2005 |
| GB | 2288301 A | 4/1994 |
| WO | 0007315 A1 | 2/2000 |
| WO | 02054820 A2 | 7/2002 |
| WO | WO 02/054820 A2 | 7/2002 |
| WO | WO 00/76145 A1 | 12/2002 |
| WO | 2004012464 A2 | 2/2004 |
| WO | 2005029901 A2 | 3/2005 |
| WO | 2005067334 A1 | 7/2005 |
| WO | 2005104587 A1 | 11/2005 |
| WO | 2005107312 A1 | 11/2005 |
| WO | 2006/040673 A2 | 4/2006 |
| WO | 2007082368 A1 | 7/2007 |
| WO | 2004100452 A1 | 11/2007 |

OTHER PUBLICATIONS

International Preliminary Report on Patentability for PCT Application PCT /CA2004/001996, Dated Apr. 25, 2006.

Smadi et al. Dynamically Anchored Conferencing Handoff for Dual-Mode Cellular/WLAN Handsets—IEEE Publication 2006.

Smadi et al. A Measurement-Based Study of WLAN to Cellular Handover—IEEE Publication 2006.

European Examiner's Report—04818739.7-2412, Dated—Jul. 10, 2008.

SEAMLESS CALL SWITCHING IN A DUAL MODE ENVIRONMENT

CROSS-REFERENCE TO RELATED APPLICATION

The present application is a continuation of and claims priority to U.S. Non-Provisional Patent Application entitled "Seamless Call Switching In A Dual Mode Enviroment" having Ser. No. 10/992,934 and a filing date of 19 Nov. 2004, which further claims priority to U.S. Provisional Patent Application entitled "Seamless Call Switching In A Dual Mode Environment" having Ser. No. 60/523,644 and a filing date of 20 Nov. 2003.

BACKGROUND

1. Field of the Technology

The present application relates generally to seamlessly switching between different wireless networks during a voice call involving a mobile communication device which is compatible with these wireless networks.

2. Description of the Related Art

In the field of wireless communications, the problem of seamlessly switching communications between two incompatible wireless networks for a mobile communication device has not been adequately addressed.

One major issue is how to switch between two different wireless networks without dropping an active call, such as a voice call, involving the mobile device. In an exemplary situation, the mobile device may he compatible with both GSM/GPRS technologies and 802.11 technologies but yet be unable to seamlessly switch between these networks during active calls. This switching would need to take place without dropping the active call and, preferably, without letting either party know that the switching has taken place.

SUMMARY

Methods and apparatus for providing a seamless switching of voice calls between different wireless networks are described herein. In one illustrative example, a mobile communication device has a processor and one or more wireless transceivers coupled to the processor. The one or more wireless transceivers include a first transceiver portion operative in accordance with a first wireless network (e.g. GSM/GPRS cellular network) and a second transceiver portion operative in accordance with a second wireless network (e.g. 802.11 wireless network). That is, the mobile device is a dual-mode device.

A voice call is maintained between the mobile device and a communication terminal through call control equipment. The processor of the mobile device is operative to maintain voice communications for the voice call over a traffic channel established between the mobile device and the first wireless network using the first transceiver portion; cause a connecting call to be established with the communication terminal through the call control equipment based on a predetermined condition, where the connecting call involves a traffic channel established between the second wireless network and the mobile device using the second transceiver portion; and after the connecting call is established, maintain voice communications for the voice call over the traffic channel established between the second wireless network and the mobile device.

In one embodiment, the one or more processors of the mobile device cause the connecting call to be established by causing a network switching message to be sent to the call control equipment; receiving a call initiation message from the second wireless network for the connecting call in response to sending the network switching message; and causing a call answering message to be sent to the second wireless network based on receiving the call initiation message from the second wireless network, for thereby establishing the traffic channel between the second wireless network and the mobile device.

Other aspects and features of the present application will become apparent to those ordinarily skilled in the art upon review of the following description of specific embodiments of the present invention in conjunction with the accompanying figures.

BRIEF DESCRIPTION OF THE DRAWINGS

Embodiments of the present application will now be described, by way of example only, with reference to the attached figures. Same reference numerals are used in different figures to denote similar elements.

DETAILED DESCRIPTION OF THE PREFERRED EMBODIMENTS

Methods and apparatus for providing a seamless switching of voice calls between different wifeless networks are described herein. In one illustrative example, a mobile communication device has a processor and one or more wireless transceivers coupled to the processor. The one or more wireless transceivers include a first transceiver portion operative in accordance with a first wireless network (e.g. GSM/GPRS cellular network) and a second transceiver portion operative in accordance with a second wireless network (e.g. 802.11 wireless network). Thus, the mobile device is a dual-mode wireless device. A voice call may be maintained between the mobile device and a communication terminal through call control equipment. The processor of the mobile device is operative to maintain voice communications for the voice call over a traffic channel established between the mobile device and the first wireless network using the first transceiver portion; cause a connecting call to be established with the communication terminal through the call control equipment in response to a predetermined condition, where the connecting call involves a traffic channel established between the second wireless network and the mobile device using the second transceiver portion; and after the connecting call is established, maintain voice communications for the voice call over the traffic channel established between the second wireless network and the mobile device. In one embodiment, the one or more processors of the mobile device cause the connecting call to be established by causing a network switching message to be sent to the call control equipment; receiving a call initiation message from the second wireless network for the connecting call in response to sending the network switching message; and causing a call answering message to be sent to the second wireless network based on receiving the call initiation message from the second wireless network, for thereby establishing the traffic channel between the second wireless network and the mobile device.

Figure 1:
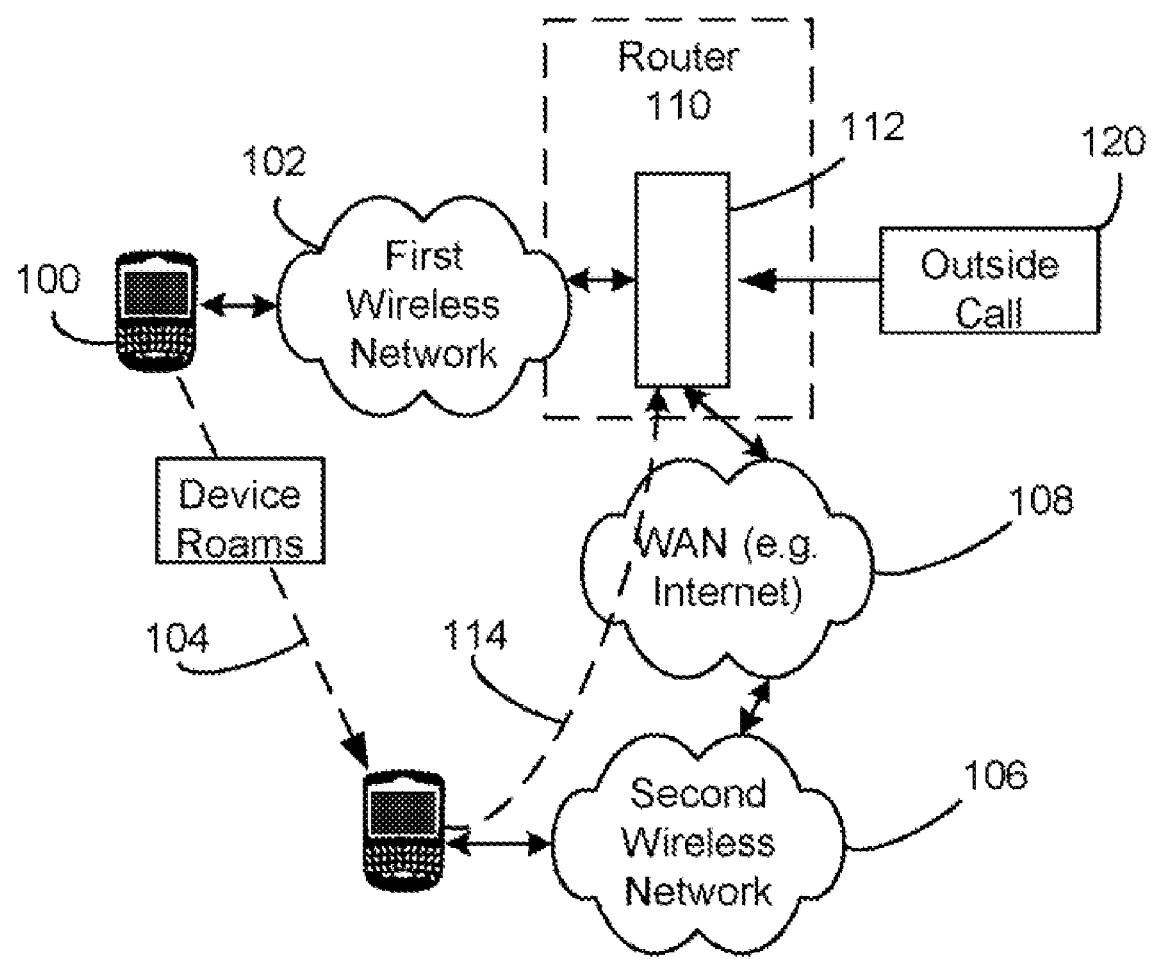
FIG. 1 is an illustration of a call control center located in a carrier's network infrastructure for handling call routing issues.

Turning to FIG. 1 there is shown a system for handling the seamless switching of voice calls for a mobile communication device 100. In the embodiment of FIG. 1, call control equipment 112 is located in a carrier's network infrastructure for handling call control. The basic architecture for call control equipment 112 is shown later in relation to FIG. 10. In FIG. 1, mobile device 100 is shown to operate in a first wireless network 102, which is a wide area wireless network such as a cellular telecommunications network. For example, the first wireless network 102 may be a Global Systems for Mobile Communications (GSM) and General Packet Radio Service (GPRS) based network. A router 110 routes and connects outside calls 120 to mobile device 100 with the help of the subcomponent referred to as the call control equipment 112. In this embodiment, router 110 resides within, or in close proximity to, the carrier's network. Router 110 may be a wired or wireless router and, preferably, router 110 is a wireless router.

Second wireless network 106 is different from first wireless network 102; that is, the networks 102 and 106 support different wireless communication technologies and protocols. To one skilled in the art, this second wireless network 106 may support one several different types of networks including cellular networks and non-cellular networks. These networks may include, but are not limited to, those based on Code Division Multiple Access (CDMA), CDMA2000, Universal Mobile Telecommunications Services (UMTS), iDEN, and Bluetooth. Preferably, however, second wireless network 106 is an 802.11 based network located in a "hot spot". In the present application, the 802.11 network may be referred to as a wireless local area network (WLAN). WLANs are typically wire-connected to the Internet using traditional Telco connections to provide higher bandwidth data communications for mobile devices. A WLAN typically operates in accordance with IEEE or ETSI standards, for example, although any suitable communication technologies may be utilized. Second wireless network 106 is connected to a wide area network (WAN) 108, such as the Internet, to which call control equipment 112 is also connected. Preferably, second wireless network 106 and mobile device 100 support Voice over Internet Protocol (VoIP) voice communications. In a primary embodiment described herein, mobile device 100 maintains a preference for using second wireless network 106 (i.e. the local area network or 802.11 WLAN) over first wireless network 102 (i.e. the wide area cellular network) and attempts to utilize it for communications whenever possible.

Mobile device 100 may be on a voice call with a communication terminal (not shown in FIG. 1) over first wireless network 102. This voice call is established through or by call control equipment 112. During the voice call, mobile device 100 may be moved 104 between first wireless network 102 and a second wireless network 106. As mobile device 100 reaches second wireless network 106, it detects the hot spot through coverage indicators and protocol handshakes, techniques that are well known in the art. In response, mobile device 100 may send a message 114 to call control equipment 112 upon entry into the hot spot area. The message indicates that mobile device 100 has entered within range of a supportable 802.11 hot spot. The message may further indicate that the voice call and any data routing mechanism should be "shifted" to the new network. Alternatively, the transition may be made by manual user intervention. In any case, if network switching is performed, cost and speed savings may be achieved by using the 802.11 network instead of the wide-area GSM/GPRS network.

In an alternate technique, mobile device 100 delays for a time period during which coverage and/or registration in second wireless network 106 is maintained before causing the transition. This time period is monitored with use of a timer. If the connection with second wireless network 106 fails during this time period, mobile device 100 refrains from causing any transition (e.g. refrains from sending the message) and the timer is reset. If coverage and/or registration with second wireless network 106 is re-established, mobile device 100 again delays for the timer period before causing the transition. Preferably, the mobile device delays for a time period greater than 1 minute. Alternatively, time period is greater than 30 seconds, such as between about 30 seconds and 2 minutes.

For transitioning between the networks, call control equipment 112 silently places a second call to mobile device 100. This second call involves the communication terminal involved in the initial voice call with mobile device 100 in a conference call type connection. As mobile device 100 is expecting this second call because it initiated the request, mobile device 100 may silently and seamlessly accept this second call. Mobile device 100 then switches its audio paths from the first call to the second call. Preferably, the VoIP communications is utilized in the 802.11 hot spot area for this call. Note that the transition may be done in a gradual fashion where audio signals from both calls are first mixed and gradually increased/decreased in volume until the complete transition is made; alternatively the transition is abrupt where there is little if any overlap of the audio. The signal 114 may be sent over Session Initiation Protocol (SIP) through an IPv6 network link to call control equipment 112. Alternatively, the solution operates in connection with traditional technology and data, links available and operating in wireless data networks. Therefore, this technique requires neither SIP nor IPv6 to operate, although it is compatible with these technologies if they were present.

Stability of the new (second) call is ensured over time so that, the original (first) call may be released. That is, the mobile device 100 delays for a time period during which the second call is maintained before causing the first call to be released. The time period is monitored through use of a timer. If the second call fails during this time period, mobile device 100 maintains the first call and the timer is reset. If the second call is reattempted, mobile device 100 again delays for the timer period before releasing the first call. Preferably, the mobile device delays for a time period greater than 1 minute.

Alternatively, time period is greater than 30 seconds, such as between about 30 seconds and 2 minutes.

The call splitting functionality of call control equipment 112 may be achieved in a few different ways. One known useful component is provided by OnRelay of the United Kingdom. A technology component called a Mobile Branch Exchange (MBX) from OnRelay is a server that resides adjacent to a Public Branch Exchange (PBX). This MBX takes a copy of an incoming call and rings a cell phone number at the same time as an associated desk phone, enabling the end user to pick up the call in either location. Similarly, for mobile originated calls, the MBX receives the call information as a Short Message Server (SMS) message, places a call to the mobile and to the called party, making the called party think that the call is originating from the user's desk phone. One feature of the MBX is that a user may be on a mobile device call and, when the user gets back to his/her desk phone, may pick up the desk phone and release the mobile device call—similar to switching phones in the same household. MBX in its current form may handle either conventional or IP-based PBX systems. It has been developed solely for use in a PBX environment and routing/bridging calls between PBXs and mobile phones.

Other technology components, especially those enabling mobile "dual-mode" communications and mobile VoIP, may be utilized to achieve optimized results for the present techniques. Specifically, optimized features include (1) expanded call control features, either through SIP or some other mechanism, allowing the interfacing to an 802.11 network at the same time as controlling a PBX; alternatively a separate 802.11 access point (AP) could be used and call control center 112 could interface directly to it; (2) the presence of dual-mode handsets; (3) a central control and command infrastructure to access calls and data and to route to either network as necessary; (4) communicating 'out-of-band' to the mobile device 100 while maintaining a phone call. Specifically, for example, Qualcomm announced the implementation of both WCDMA (a.k.a. UMTS) and GSM calls with a mobile device using a radioOne™ direct conversion RF dual-mode solution technology. The mobile device utilized an integrated MSM6200(™) Mobile Station Modem (MSM™) chipset solution, consisting of the MSM6200 UMTS/GSM/GPRS baseband modem, RFL6200™ and RFR620™ WCDMA receivers, RTR6200™ GSM transceiver with WCDMA transmitter, and PM6050™ power management device. In addition, a company called Spectralink of Boulder, Colo., U.S.A., makes Voice over IP (VoIP) telephony technology using 802.11-based handset phones. This technology component allows owners of traditional PBX phone systems in an enterprise business take advantage of VoIP phones. A NetLink PRI Gateway connects to PBX phone systems that have a trunked ISDN primary rate interface (PRI) so it may support several mobile devices simultaneously. The gateway, in turn, connects to the wired network and on to the access points (APs) that talk to the VoIP handsets.

Figure 2:
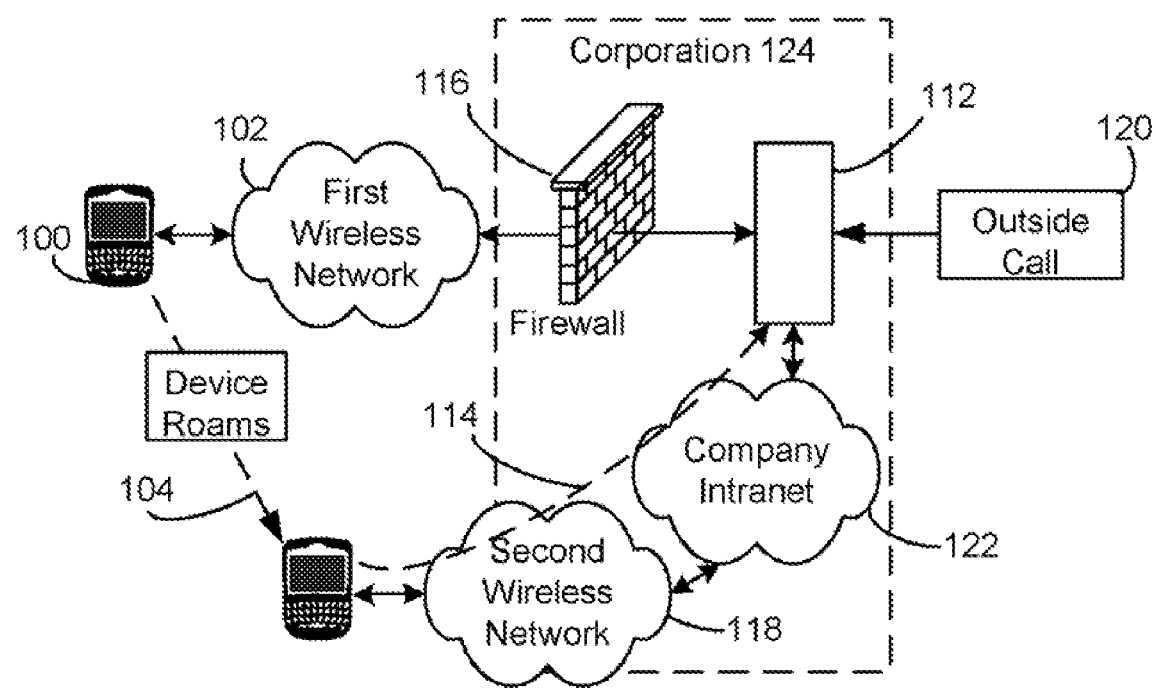
FIG. 2 is an illustration of a call control center located within a corporation for handling call routing issues.

Turning now to FIG. 2, there is shown an illustration of call control center 112 being located within a corporation 124. A second wireless network 118 within or adjacent corporation 124 is a wireless 802.11 LAN sometimes termed a "Wi-Fi" network. These wireless LAN solutions are now commonly supported within such corporations 124. Companies are currently using wireless LAN solutions to support the campus-wide demand for an Intranet 122 within corporation 124. Once connected to the Intranet 122, access to company resources becomes possible. Naturally, the second wireless network 118 is seen as bridging a firewall 116 protection of the corporation 124 (if any), most corporations are currently addressing these security problems today where applicable.

An initial voice call is either received or placed by mobile device 100. For calls placed from mobile device 100, the desire to place a call is signalled to call control equipment 112, which then simultaneously places the voice call to mobile device 100 and the communication terminal that the end user of mobile device 100 desires to call. In this way, call control equipment 112 retains control of the voice call at all times. As mobile device 100 moves from first wireless network 102 (e.g. GSM/GPRS) to second wireless network 118 (e.g. 802.11 wireless LAN), the voice call is initially maintained in GSM/GPRS. Note that the 802.11 transceiver portion on mobile device 100 operates independently of the GSM/GPRS transceiver portion on the same mobile device 100.

Next, mobile device 100 uses 802.11 to send a signal 114 through second wireless network 118. Signal 114 instructs call control equipment 112 to place another call to mobile device 100 through the 802.11 network. This second call involves the communication terminal involved in the initial voice call with mobile device 100 in a conference call type connection. Thus, as mobile device 100 moves onto campus and locks onto second wireless network 118, mobile device 100 messages call control equipment 112 to place the second call to mobile device 100 over second wireless network 118. Call control equipment 112 may either perform this function directly or request the PBX to connect the additional call, depending on the specific design of call control equipment 112. Once mobile device 100 has the new call, it merges it with the existing voice call, performs a final check to ensure that the new call is of adequate quality, and then terminates the GSM/GPRS call.

As described, this changeover may be performed automatically by mobile device 100 with or without being governed by algorithms that detect a "constant and clean" 802.11 signal corresponding to second wireless network 118. For example, if a signal is detected that has a signal quality of 'X', for a period of 'N' minutes, then the second call may be warranted. Thus, mobile device 100 delays for a time period during which coverage and/or registration in second wireless network 118 is maintained before causing the transition. This time period is monitored with use of a timer. If the connection with second wireless network 118 fails during this time period, mobile device 100 refrains from causing any transition (e.g. retrains from sending the message) and the timer is reset. If coverage and/or registration with second wireless network 118 is reestablished, mobile device 100 again delays for the timer period before causing the transition. Preferably, the mobile device delays for a time period greater than 1 minute. Alternatively, time period is greater than 30 seconds, such as between about 30 seconds and 2 minutes. Using an alternative technique, no automatic transitioning is performed by mobile device 100 but rather mobile device 100 visually displays an option for or choice between networks for the end user. The end user may select the new second network which causes the transition.

Either mobile device 100 or call control equipment 112 may control the process of determining at what point in time to drop the merged call. In one embodiment, mobile device 100 is better situated to determine how long to hold the two calls and to understand the conditions needed to be able to drop the first call. In another embodiment, there is greater elegance for call control equipment 112 to handle dropping the initial call, for example, by maintaining a timer. Once the second call is primary to mobile device 100, call control center 112 may seamlessly drop the original call portion.

Thus, stability of the new (second) call is ensured over time so that the original (first) call may be released. That is, the mobile device 100 delays for a time period during which the second call is maintained before causing the first call to be released. The time period is monitored through use of a timer. If the second call fails during this time period, mobile device 100 maintains the first call and the timer is reset. If the second call is reattempted, mobile device 100 again delays for the timer period before releasing the first call. Preferably, the mobile device delays for a time period greater than 1 minute. Alternatively, time period is greater than 30 seconds, such as between about 30 seconds and 2 minutes.

Figure 3:
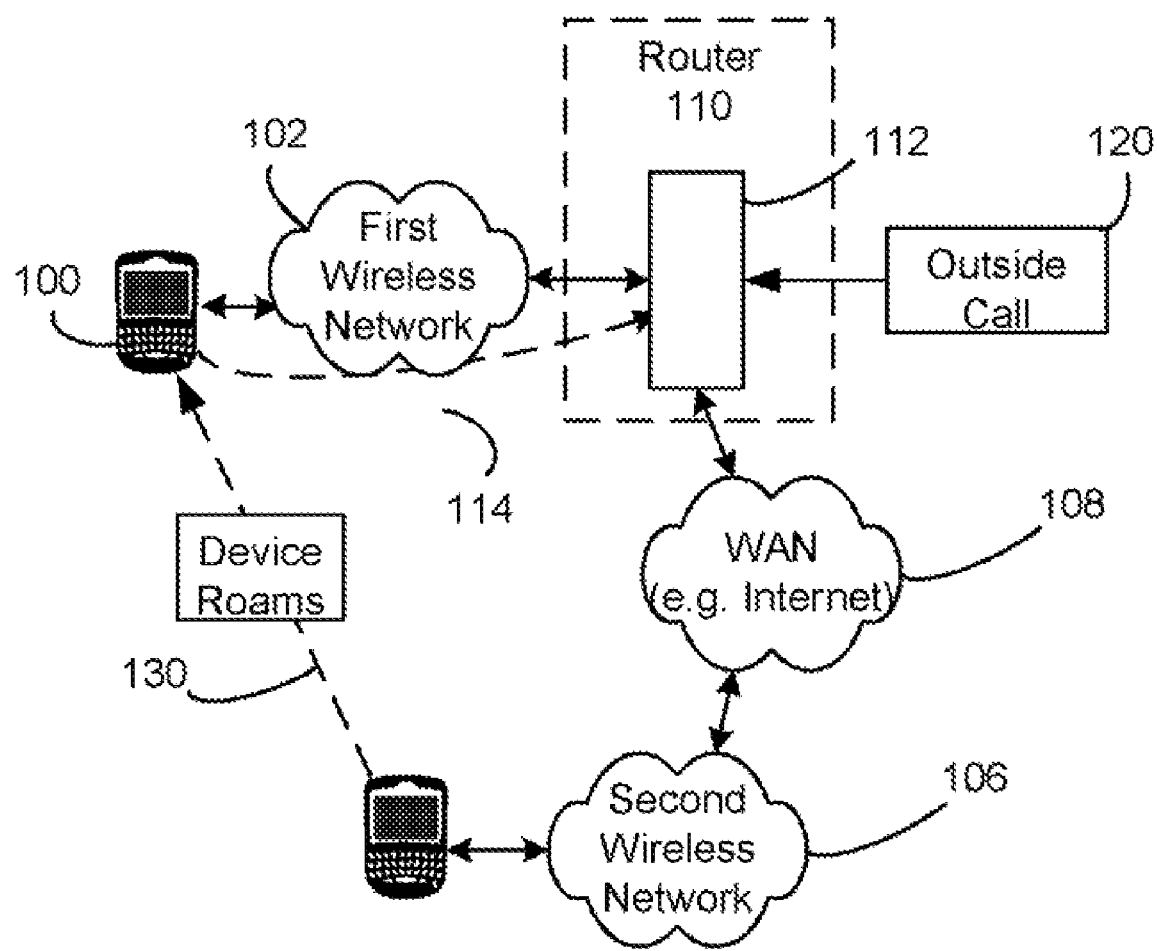
FIG. 3 is an illustration of a mobile device roaming away from an 802.11 hot spot where the call control center located within a wireless network.

Turning now to FIG. 3, there is shown an illustration of mobile device 100 heading away from an 802.11 hot spot where call control center 112 is located within second wireless network 106. All elements of the solution are identical to FIG. 1, except for mobile device 100 is now moving away from the 802.11 hotspot. This scenario is more complicated then that described in relation to the previous figures as mobile device 100 is slowing losing coverage and voice quality. Mobile device 100 maintains 802.11 coverage as long as possible, as this is the cheapest and fastest communication method. As coverage fails, mobile device 100 may send a signal to call control equipment 112 automatically or through a user request. Mobile device 100 uses first wireless network 102 (GSM/GPRS) to send signal 114 as this should be more reliable. Call control equipment 112 then places a second call to mobile device 100 over first wireless network 102. This second call involves the communication terminal involved in the initial voice call with mobile device 100 in a conference call type connection. As described in relation to the previous figures, mobile device 100 quietly receives this second call, and may merge the two calls similar to a conference call connection. Shortly thereafter, the first call is dropped and the user is left with the call through first wireless network 102. Note that, in this embodiment, it is possible that the end user might have to force early termination of the first call if static and voice quality drops too quickly. This could result in a small delay or detection by the other party that a transition has occurred.

Figure 4:
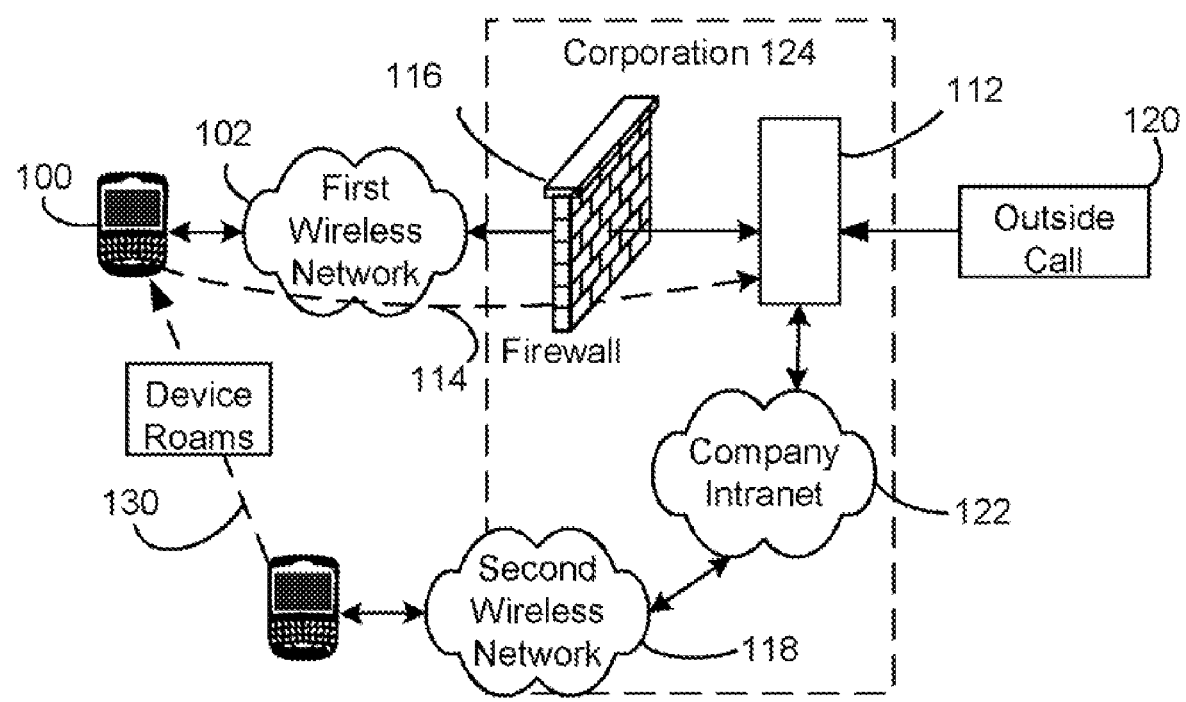
FIG. 4 is an illustration of a mobile device roaming away from an 802.11 corporate access point where the call control center located within the corporation.

Turning now to FIG. 4, there is shown an illustration of mobile device 100 heading away from an 802.11 corporate access point (AP) where call control center 112 is located within the corporation 124. The elements shown in FIG. 4 are similar to FIG. 2 except that mobile device 100 is moving away from second wireless network 118. In this scenario, mobile device 100 detects a reduced signal from second wireless network 118, or the user invokes a menu that allows them to control network switching (e.g. they realize they are leaving the 802.11 campus area). As in FIG. 3, signal 114 is communicated over the first wireless network 102 as the reliability should be higher. When the message is received by call control equipment 112, it issues a second call over first wireless network 102 to mobile device 100. This second call involves the communication terminal involved in the initial voice call with mobile device 100 in a conference call type connection. Mobile device 100 then answers the call, preferably silently without disruption, and merges the two calls similar to a conference call. After a period of time (e.g. in the range of seconds or less), mobile device 100 or call control equipment 112 drops die original call in favor of the second call over first wireless network 102.

A voice call 120 may also be received on or placed to mobile device 100 using a voice over IP (VoIP) method on the 802.11 network 118. Call control equipment 112 retains control of the voice call 120 at all times. As the caller's connection to second wireless network 118 starts to fade (or a handover is initiated by the caller through the push of a button on the mobile device 100), mobile device 100 signals 114 through second wireless network 118 to instruct call control equipment 112 to initiate a call over first wireless network 102. Mobile device 100, with knowledge that an incoming call is imminent and the number the call is coming from, silently accepts the call and authenticates it as a handover of the current call over second wireless network 118. From here, the two calls are merged (similar to a conference call). Once its confirmed that the new call is stable and ready, mobile device 100 or call control equipment 112 drops the 802.11 call, and the new GSM/GPRS call is maintained. Neither party on the phone detects any mode change taking place assuming both 802.11 quality of service is acceptable and GSM/GPRS reception is good. Note that there is always at least one call session active on mobile device 100 at any given point of time.

In an alternative embodiment, where mobile device 100 hits a dramatic "falling off" of 802.11 coverage, call control equipment 112 intervenes and automatically switches the call over first wireless network 102 (GSM/GPRS). In this situation, call control equipment 112 may notice that data intended for mobile device 100 fails to be delivered, or that the call has been dropped on the 802.11 network. In this case, the call is automatically moved over to the wide-area GSM/GPRS network for recovery. To assist with interruption, call control equipment 112 may inform the other party by audio that they will be reconnected momentarily while initiating an outbound GSM/GPRS connection to mobile device 100. Alternatively, mobile device 100 may initiate the resumption of the call over GSM/GPRS by detecting the unintentional loss of the 802.11 call and immediately sending a "resume" call packet over the GSM/GPRS network to call control equipment 112. This message may be a simple datagram using proprietary protocols or a SIP-based message as already discussed.

Figure 5:
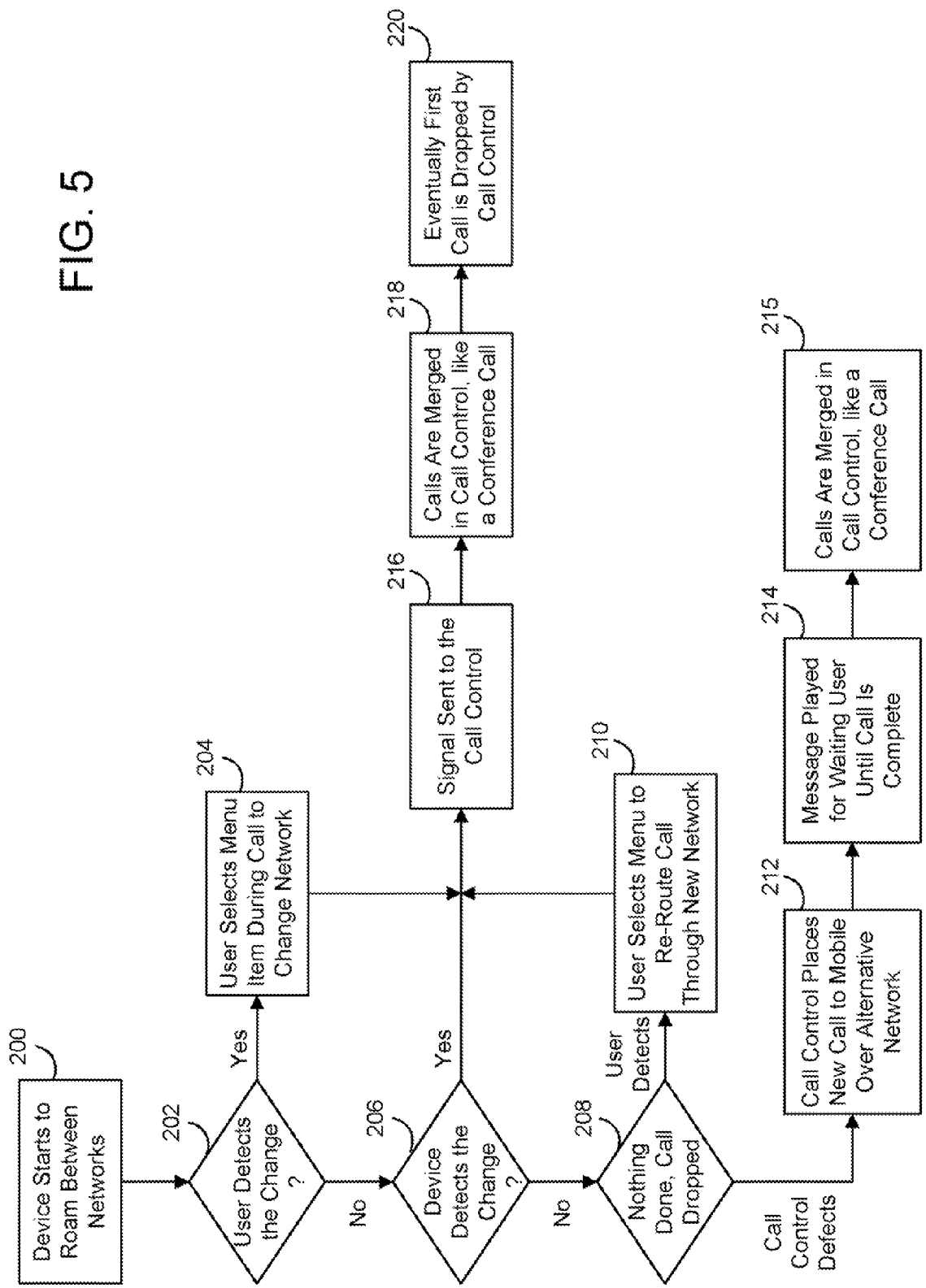
FIG. 5 is an illustration of a data flow diagram that supports the mobile device's behaviour when roaming from one network to another.

Turning to FIG. 5, there is shown an illustration of a data flow diagram supporting the mobile device's behavior when moving from one network to another. In step 200, the user and mobile device are moving and eventually a transition stage is reached. This is a stage where mobile device is in coverage of two different networks. If the user detects a change (step 202), perhaps either in voice quality or by knowledge of an alternative network option, they may act on such situations. The alternative network could be a less expensive option like 802.11 or Bluetooth, or they might be leaving an 802.11 network shortly and want to return to their wide-area GSM/GPRS network connection. If the user desires to change the network, the user may invoke a menu and request the network change directly through the user interface (step 204).

If the mobile device detects a change in step 204, either through reduced coverage parameters, or in the arrival of a new network connection with higher priority, it may decide to make a change. A network may have a different priority due to a better cost or speed. If the mobile device does not detect that a change is needed or possible in step 204, then it is loss of the call that determines that something must be done. When the call is dropped in step 208, either the user acts on the problem or the call control equipment detects the problem and acts. If the user detects the call is lost and decides to act at step 208, the user may select a menu item on the mobile device to request the call be re-routed to an alternative network (step 210). In an exemplary situation, the user has just left an 802.11 network and coverage on the wide-area GSM/GPRS network was initially too weak to support a call. Then, within seconds, the coverage improves and the call is routed to the mobile device before the other party drops off.

If the call control equipment detects that the call has dropped in step 208, it places a call to the mobile device to open a new call through an alternative network connection (step 212). If configured and selected by the user, a message may be played for the other caller (step 214). When the call is completed the calls are bridged or connected together (step 215). Referring back to the step 206, where the mobile device detects the change in network coverage, or after the user selects a menu to change networks at steps 204 and 210, a signal is next sent to the call control equipment (step 216). In response, the call control equipment bridges or connects the calls together (step 218), similar to a conference call connection. After a certain length of time during which the new call is stable, the first call is dropped (step 220).

Figure 6:
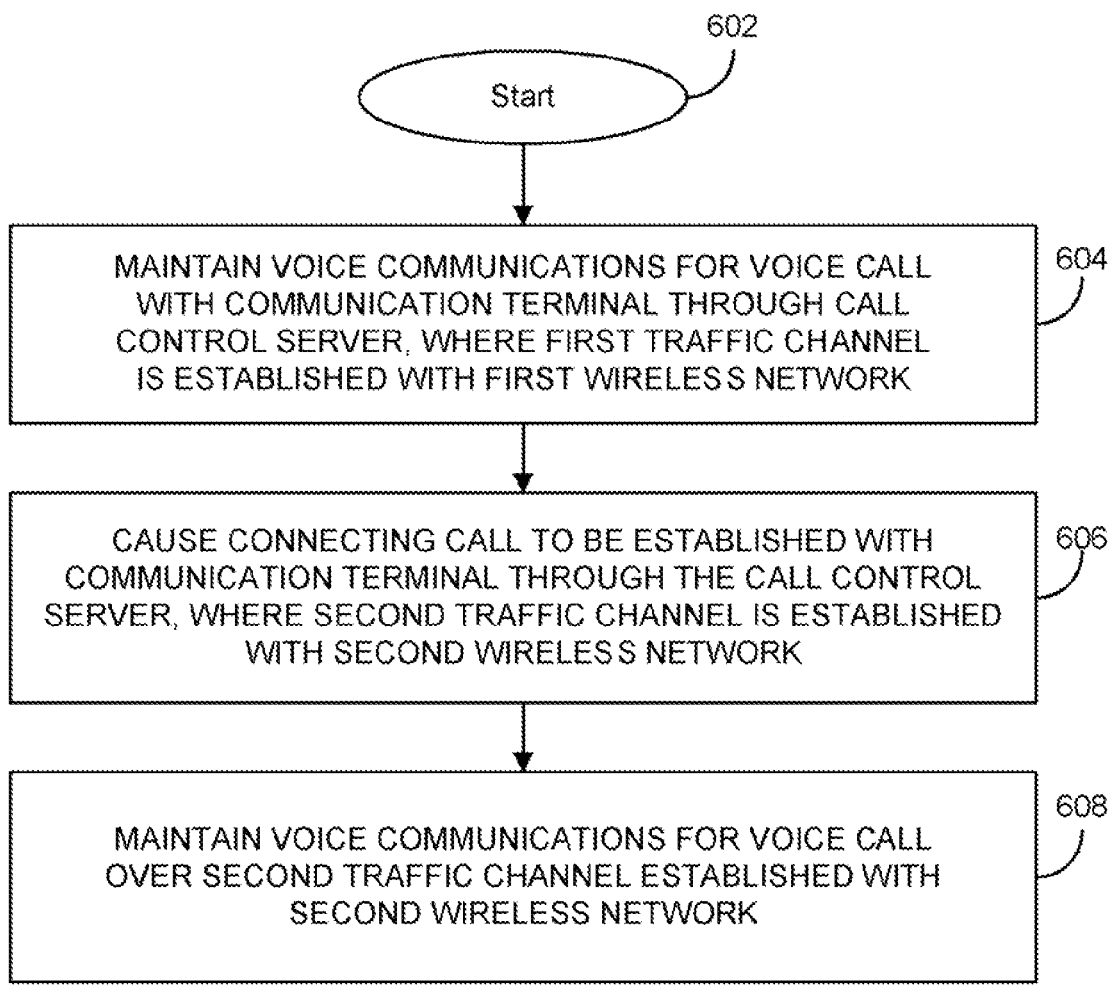
FIG. 6 is a flowchart for describing the mobile device method of providing the seamless switching of networks for voice calls.

FIG. 6 is a flowchart which describes a method for use by a mobile communication device in switching voice calls between two different wireless communication networks. This method may be performed in the environment(s) described in relation to FIGS. 1-4, with the mobile device shown and described later in relation to FIGS. 9-10. Note that although the method describes the transition from a first wireless network to a second wireless network, the same or similar techniques may be utilized for transitioning from the second wireless network to the first wireless network. The steps are performed by one or more controllers or processors (e.g. a microprocessor and/or DSP) of the mobile device, in connection with any other necessary device components (e.g. its RF transceiver portions). As apparent from this method description, the call control equipment performs a complimentary method (see FIG. 7) associated with the mobile device method. A computer program product, of the present application may include a storage medium (e.g. FLASH memory) and computer instructions stored in the storage medium which are executed by the one or more processors for performing such methods. In this method, the mobile device has a first transceiver portion which operates in accordance with a first wireless network (e.g. GSM/GPRS cellular network) and a second transceiver portion which operates in accordance with a second wireless network (e.g. 802.11 wireless network). Preferably, Voice over IP (VoIP) communications is utilized through one of the wireless networks (e.g. the 802.11 network) for a lower cost alternative. Note further that the mobile device may be associated with at least two different unique identifiers (e.g. telephone number, mobile telephone number, and/or IP address) for implementing the method. As an example, the mobile device may publish or provide only a corporate enterprise telephone number for others to contact the mobile device. When dialed by an outside caller, this telephone number call always gets routed to the call control equipment, which causes the mobile device to be alerted to the incoming call within the enterprise (e.g. the call control equipment using the telephone number or IP address of the mobile device via the 802.11 network) and/or outside the enterprise (e.g. the call control equipment using the mobile telephone number of the mobile device via the cellular network).

Beginning at a start block 602 of FIG. 6, the mobile device maintains voice communications for a voice call established between the mobile device and a communication terminal through the first wireless network (step 604 of FIG. 6). This call is facilitated through the call control equipment. From the perspective of the mobile device, the voice call involves one or more traffic channels established between the first wireless network and the mobile device using the first transceiver portion. During the voice call, the mobile device causes a connecting call to be established with the call control equipment (step 606 of FIG. 6). This connecting call involves the communication terminal involved in the initial voice call with the mobile device in a conference call type connection. In addition, the connecting call involves one or more traffic channels established between the second wireless network and the mobile device using the second transceiver portion. Subsequently, the mobile device maintains voice communications for the voice call over the traffic channel established between the second wireless network and the mobile device (step 608 of FIG. 6). Note that the call control equipment causes the voice communications of the voice call through the first wireless network to be replicated in the connecting call through the second wireless network, so that the mobile device simultaneously maintains the voice communications for the voice call through both the first and the second wireless networks.

The mobile device may cause the connecting call of step 606 to be established in a number of different ways. In one embodiment, the mobile device initially causes a network switching message to be sent to the call control equipment upon detection of a predetermined condition. In this case, the mobile device subsequently receives a call initiation message (e.g. a page message for a call) from the second wireless network for the connecting call that is sent in response to the network switching message. In response to the call initiation message, the mobile device answers the connecting call by causing a call answering message (e.g. a page response message) to be sent to the second wireless network, which thereby establishes the one or more traffic channels between the second wireless network and the mobile device. In an alternative embodiment, the call control equipment initiates the connecting call without the need to receive any network switching message from the mobile device. In yet another alternative embodiment, the mobile device is the entity that initiates the connecting call to the call control equipment by sending a call initiation message to the second wireless network, where the call control equipment automatically answers the connecting call.

Either way, the mobile device "automatically" and "silently" performs the activities necessary in step 606 of FIG. 6 for calling or answering the connecting call. Put another way, the activities in step 606 may be performed by the mobile device so as to be transparent to the end user. Alternatively, the mobile device may cause a user input prompt to be visually displayed in its visual display (or invoke a "call ringing" at the mobile device) for end user selection of whether the alternative (second) wireless network should be utilized. If the alternative wireless network is selected by the end user, the mobile device causes the connecting call to be established with the call control equipment. If the alternative wireless network is not selected by the end user, the mobile device does not cause the connecting call to be established with the call control equipment (i.e. the mobile device remains on the first wireless network).

As indicated earlier, the connecting call of step 606 may be established in response to identifying a predetermined condition. The predetermined condition may be, for example, a poor signal condition between the mobile device and the first wireless network (e.g. the 802.11 wireless network). As another example, the predetermined condition may be a predetermined signal detection of the second wireless network (e.g the local area 802.11 wireless network). That is, the mere detection of the availability of the second wireless network may be sufficient for the establishment of the connecting call with the call control equipment. As yet another example, the predetermined condition may be a user input signal detected at the mobile device. Specifically, the mobile device may visually display a user input prompt or an option (e.g. pop-up input prompt) for the end user to select the alternative (second) wireless network when it becomes available; the end user selection of this option is the user input signal which triggers the connecting call to the call control equipment. Note that the predetermined condition is preferably identified and acted upon at the mobile device, but may alternatively be identified and acted upon at the call control equipment.

The mobile device may delay for a time period during which coverage and/or registration in second wireless network (e.g. 802.11) is maintained before causing the transition. This time period is monitored with use of a timer. If the connection with second wireless network fails during this time period, the mobile device refrains from causing any transition (e.g. refrains from sending the message) and the timer is reset. If coverage and/or registration with second wireless network is re-established, the mobile device again delays for the timer period before causing the transition. Preferably, the mobile device delays for a time period greater than 1 minute. Alternatively, time period is greater than 30 seconds, such as between about 30 seconds and 2 minutes. Similarly, stability of the new (second) call may be ensured over time so that the original (first) call may be released. That is, the mobile device delays for a time period during which the second call is maintained before causing the first call to be released. The time period is monitored through use of a timer. If the second call fails during this time period, the mobile device maintains the first call and the timer is reset. If the second call is reattempted, the mobile device again delays for the timer period before releasing the first call. Preferably, the mobile device delays for a time period greater than 1 minute. Alternatively, time period is greater than 30 seconds, such as between about 30 seconds and 2 minutes.

Depending on the specific implementation, at some point in time the mobile device may completely switch its audio paths (speaker and microphone) from the one or more traffic channels with the first wireless network to the one or more traffic channels with the second wireless network. This may be done in a quick and abrupt fashion or, alternatively, in a gradual fashion where the audio signals of both calls are first mixed and then subsequently gradually decreased in volume (to/from the first wireless network) and correspondingly increased in volume (to/from the second wireless network) until fully switched. Such techniques may be performed by the mobile device or alternatively by the call control equipment. At some point in time, the mobile device may cause the connection portion of the voice call from the call control equipment to the mobile device through the first wireless network to be terminated. When this happens, the one or more traffic channels with the first wireless network are terminated. This may be done by sending a suitable message to the call control equipment, for example, through the first wireless network. Alternatively, the call control equipment may initiation the termination of the connection portion of the original call.

Figure 7:
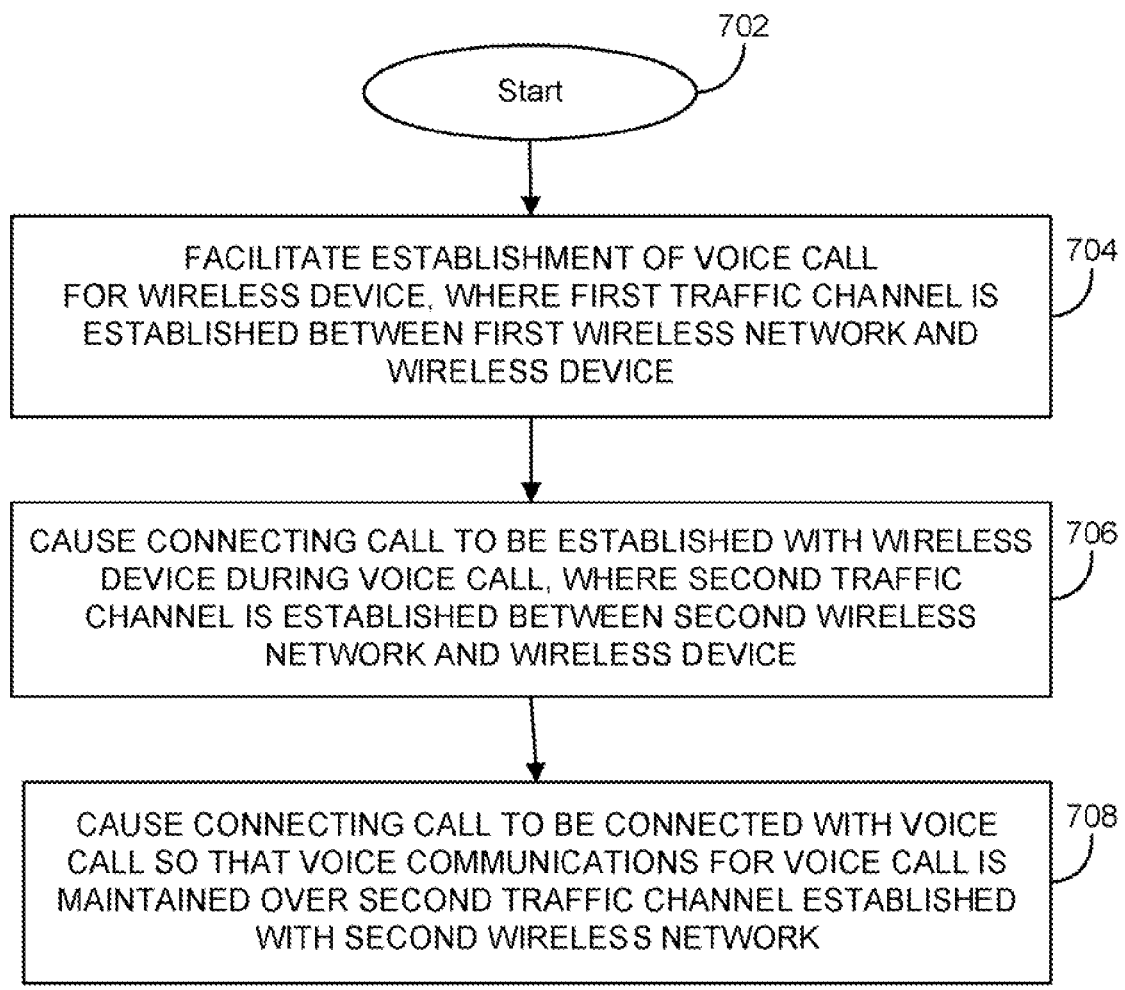
FIG. 7 is a flowchart for describing the call control equipment method of providing the seamless switching of networks for voice calls involving the mobile device.

FIG. 7 is a flowchart which describes a method for use by call control equipment in switching voice calls for a mobile device between two different wireless networks. This method may be performed in the environment(s) described in relation to FIGS. 1-4. Note that although the method describes the transition from a first wireless network to a second wireless network, the same or similar techniques may be utilized for transitioning from the second wireless network to the first wireless network. The steps are performed by computer instructions executed by one or more controllers or processors (e.g. a microprocessor) of a call control server of the call control equipment. The basic architecture for call control equipment 112 is shown later in relation to FIG. 10. As apparent from this method description, the mobile device performs a complimentary method (see FIG. 6) associated with the call control method. A computer program product of the present application may include a storage medium (e.g. memory) and computer instructions stored in the storage medium which are executed by the one or more processors for performing such methods. Preferably, Voice over IP (VoIP) communications is utilized through one of the wireless networks (e.g. the 802.11 network) for a lower cost alternative. Note that the mobile device may be associated with at least two different unique identifiers (e.g. telephone number, mobile telephone number, and/or IP address) for the method. As an example, the mobile device may publish or provide only a corporate enterprise telephone number for others to contact the device. When dialed, this telephone number always gets routed to the call control equipment which causes the mobile device to be alerted to the incoming call within the enterprise (e.g. with use of the telephone number or IP address of the mobile device via the 802.11 network) and/or outside the enterprise (e.g. with use of the mobile telephone number of the mobile device via the cellular network).

Beginning at a start block 702 of FIG. 7, the call control equipment facilitates the establishment of a voice call between the mobile device and a communication terminal through the first wireless network (step 704 of FIG. 7). From the perspective of the mobile device, the voice call involves one or more traffic channels established between the first wireless network and the mobile device. During the voice call, the call control equipment causes a connecting call to be established with the mobile device (step 706 of FIG. 7). This connecting call involves the communication terminal involved in the initial voice call with the mobile device in a conference call type connection. In addition, the connecting call involves one or more traffic channels established between the second wireless network and the mobile device. The call control equipment connects or bridges the connecting call with the voice call so that voice communications may be maintained over the traffic channel between the second wireless network and the mobile device (step 708 of FIG. 7). In particular, the call control equipment causes the voice communications of the voice call through the first wireless network to be replicated in the connecting call through the second wireless network, so that the mobile device simultaneously maintains the voice communications for the voice call through both the first and the second wireless networks. Thus, two simultaneous voice communication paths of the voice call for the mobile device are maintained by the call control equipment.

The call control equipment may cause the connecting call of step 706 to be established in a number of different ways. In one embodiment, the mobile device initially causes a network switching message to be sent to the call control equipment upon detection of a predetermined condition. In response, the call control equipment initiates the connecting call to the mobile device which causes the second wireless network to send a call initiation message (e.g. a page message for a call) to the mobile device. In response to the call initiation message, the mobile device answers the connecting call by causing a call answering message (e.g. a page response message) to be sent to the second wireless network. In an alternative embodiment, the call control equipment initiates the connecting call without the need to receive any network switching message from the mobile device. In yet another alternative embodiment, the mobile device is the entity that initiates the connecting call to the call control equipment by sending a call initiation message to the second wireless network, where the call control equipment automatically answers the connecting call.

Either way, the call control equipment and mobile device "automatically" and "silently" perform the activities necessary in step 706 of FIG. 7 for calling or answering the connecting call. Put another way, the activities in step 706 may be performed so as to be transparent to the end user of the mobile device. Alternatively, the mobile device may cause a user input, prompt to be visually displayed in its visual display (or invoke a "call ringing" at the mobile device) for end user selection of whether the alternative (second) wireless network should be utilized. If the alternative wireless network is selected by the end user, the mobile device causes the connecting call to be established with the call control equipment. If the alternative wireless network is not selected by the end user, the mobile device does not cause the connecting call to be established with the call control equipment (i.e. the mobile device remains on the first wireless network).

As indicated earlier, the connecting call of step 706 may be established in response to identifying a predetermined condition. The predetermined condition may be, for example, a poor signal condition between the mobile device and the wireless network (e.g. 802.11 network). As another example, the predetermined condition may be a predetermined signal detection of the wireless network (e.g. 802.11 network). That is, the mere detection of the availability of the second wireless network may be sufficient for the establishment of the connecting call with the call control equipment. As yet another example, the predetermined condition may be a user input signal detected at the mobile device. Specifically, the mobile device may visually display a user input prompt or an option for the end user to select the alternative (second) wireless network when it becomes available; the end user selection of this option is the user input signal which triggers the connecting call to the call control equipment. Note that the predetermined condition is preferably identified and acted upon at the mobile device, but may alternatively be identified and acted upon at the call control equipment.

At some point in time, the call control equipment may completely switch the audio paths (both receive and transmit paths) from the original voice call (i.e. through the first wireless network) to the connecting call (i.e. through the second wireless network). This may be done in a quick and abrupt fashion or, alternatively, in a gradual fashion where the audio signals of both calls are first mixed and then subsequently gradually decreased in volume (to/from the first wireless network) and correspondingly increased in volume (to/from the second wireless network) until fully switched. Such techniques may be performed by the call control equipment or alternatively by the mobile device. Thereafter, the connection portion of the voice call from the call control equipment to the mobile device through the first wireless network is terminated. When this happens, the one or more traffic channels with the first wireless network are terminated. The call control equipment may, for example, initiate the termination of the connection portion of the original call.

Figure 8:
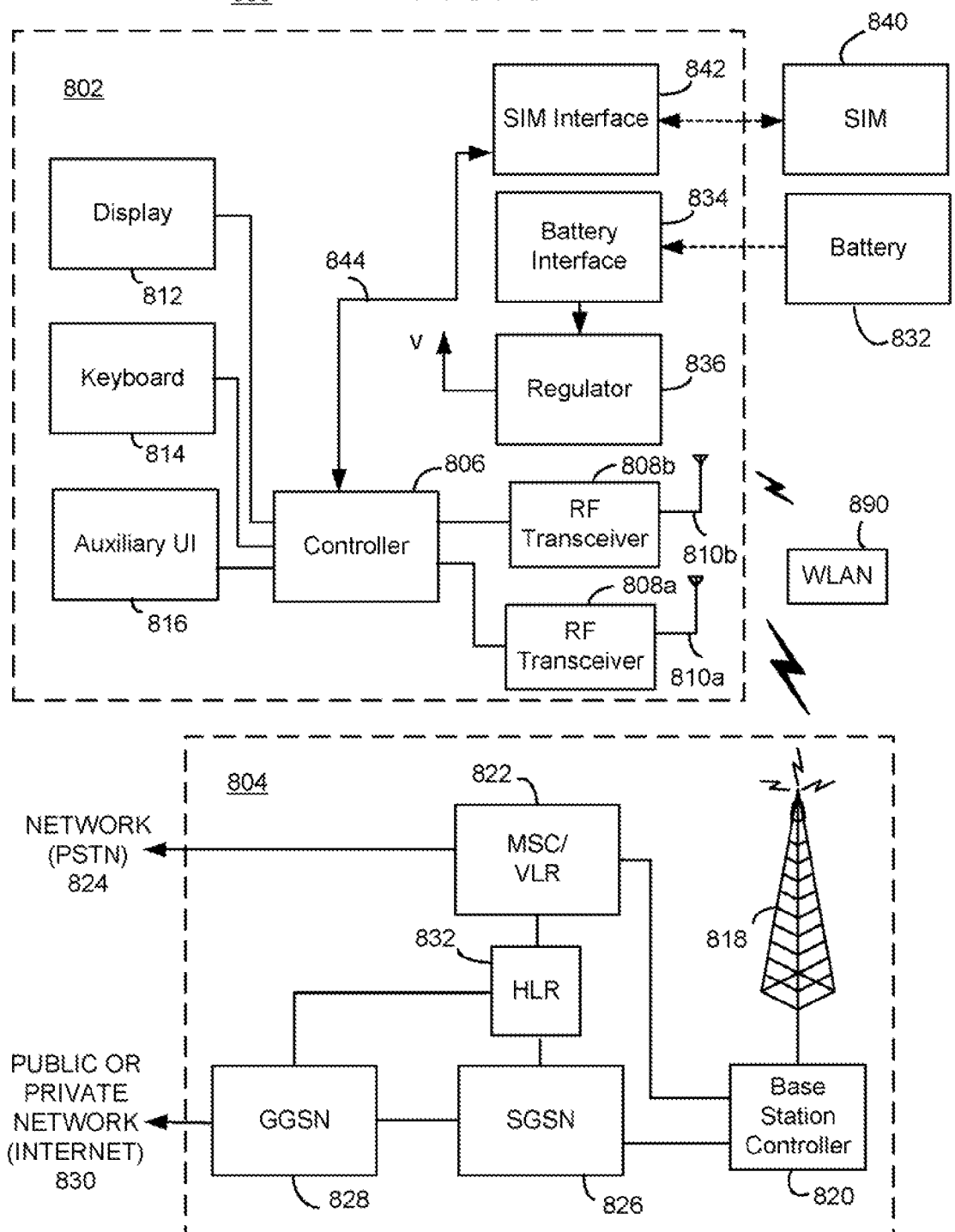
FIG. 8 is an illustration of one of the wireless communication networks within which the mobile device may communicate, where the wireless network is a GSM/GPRS based cellular telecommunications network.

FIG. 8 is a block diagram of a communication system 800 which includes a mobile communication device 802. Mobile device 802 may be utilized in the techniques of the present application as described above. As shown, mobile device 802 is adapted to communicate with a wireless local area network (WLAN) 890. Also as shown, mobile device 802 is adapted to communicate with a wireless communication network 104 which is a cellular telecommunications network. In the embodiment shown in FIG. 8, wireless network 804 is configured in accordance with General Packet Radio Service (GPRS) and a Global Systems for Mobile (GSM) technologies. However, any suitable type of network communication protocols may be utilized. For example, the network may be based on code division multiple access (CDMA) or other suitable technologies. As another example, the network may be based on an Integrated Dispatch Enhanced Network (iDEN) which is a high-capacity digital trunked radio system providing integrated voice and data services.

For wireless communication with wireless network 804, mobile device 802 utilizes radio frequency (RF) transceiver circuitry 808*a* and an antenna 810*a*. For wireless communication with WLAN 890, mobile device 802 utilizes RF transceiver circuitry 808*b* and an antenna 810*b*. With such configuration, mobile device 802 may be referred to as a "dual mode" communication device. Although shown in FIG. 8 as having separate and independent transceiver components, at least some portions or components of these otherwise different transceivers may be shared where possible.

In the embodiment shown, mobile device 802 includes a visual display 812, a keyboard 814, and perhaps one or more auxiliary user interfaces (UI) 816, each of which are coupled to a controller 806. Controller 806 is further coupled to radio frequency (RF) transceiver circuitry 808*a* and an antenna 810*a*, as well as to RF transceiver circuitry 808*b* and an antenna 810*b*. Typically, controller 806 is embodied as a central processing unit (CPU) which runs operating system software in a memory component (not shown). Controller 806 will normally control overall operation of mobile device 802, whereas signal processing operations associated with communication functions are typically performed in the RF transceiver circuitry. Controller 806 interfaces with device display 812 to display received information, stored information, user inputs, and the like. Keyboard 814, which may be a telephone type keypad or full alphanumeric keyboard, is normally provided for entering data for storage in mobile device 802, information for transmission to network 804, a telephone number to place a telephone call, commands to be executed on mobile device 802, and possibly other or different user inputs.

Mobile device 802 sends communication signals to and receives communication signals over wireless links. For communication with wireless network 804, RF transceiver circuitry 808*a* performs functions similar to those of base station 818 and base station controller 820, including for example modulation/demodulation and possibly encoding/decoding and encryption/decryption. It is also contemplated that RF transceiver circuitry 808*a* may perform certain functions in addition to those performed by base station controller 820. It will be apparent to those skilled in art that RF transceiver circuitry 808*a* will be adapted to particular wireless network or networks in which mobile device 802 is intended to operate.

Mobile device 802 includes a battery interface 834 for receiving one or more rechargeable batteries 832. Battery 832 provides electrical power to electrical circuitry in mobile device 802, and battery interface 834 provides for a mechanical and electrical connection for battery 832. Battery interface 834 is coupled to a regulator 836 which regulates power to the device. When mobile device 802 is fully operational, an RF transmitter of RF transceiver circuitry 808*a* is typically keyed or turned on only when it is sending to network, and is otherwise turned off to conserve resources. Similarly, an RF receiver of RF transceiver circuitry 808*a* is typically periodically turned off to conserve power until it is needed to receive signals or information (if at all) during designated time periods.

Mobile device 802 operates using a Subscriber Identity Module (SIM) 840 which is connected to or inserted in mobile device 802 at a SIM interface 842. SIM 840 is one type of a conventional "smart card" used to identify an end user (or subscriber) of mobile device 802 and to personalize the device, among other things. Without SIM 840, the mobile device terminal is not fully operational for communication through wireless network 804. By inserting SIM 840 into mobile device 802, an end user may have access to any and all of his/her subscribed services. SIM 840 generally includes a processor and memory for storing information. Since SIM 840 is coupled to SIM interface 842, it is coupled to controller 806 through communication lines 844. In order to identify the subscriber, SIM 840 contains some user parameters such as an International Mobile Subscriber Identity (IMSI). An advantage of using SIM 840 is that end users are not necessarily bound by any single physical mobile device. SIM 840 may store additional user information for the mobile device as well, including datebook (or calendar) information and recent call information.

Mobile device 802 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 802 may be a multiple-module unit comprising a plurality of separate components, including but in no way limited to a computer or other device connected to a wireless modem. In particular, for example, in the mobile device block diagram of FIG. 8, RF transceiver circuitry 808*a* and antenna 810*a* may be implemented as a radio modem unit that may be inserted into a port on a laptop computer. In this case, the laptop computer would include display 812, keyboard 814, one or more auxiliary UIs 816, and controller 806 embodied as the computer's CPU. It is also contemplated that a computer or other equipment not normally capable of wireless communication may be adapted to connect to and effectively assume control of RF transceiver circuitry 808*a* and antenna 810*a* of a single-unit device such as one of those described above. Such a mobile device 802 may have a more particular implementation as described later in relation to the mobile device of FIG. 9.

Using RF transceiver circuitry 808*a*, mobile device 802 communicates in and through wireless communication network 804. In the embodiment of FIG. 8, wireless network 804 is configured in accordance with GSM and GPRS technologies. Wireless network 804 includes a base station controller (BSC) 820 with an associated tower station 818, a Mobile Switching Center (MSC) 822, a Home Location Register (HLR) 832, a Serving GPRS Support Node (SGSN) 826, and a Gateway GPRS Support Node (GGSN) 828. MSC 822 is coupled to BSC 820 and to a landline network, such as a Public Switched Telephone Network (PSTN) 824. SGSN 826 is coupled to BSC 820 and to GGSN 828, which is in turn coupled to a public or private data network 830 (such as the Internet). HLR 832 is coupled to MSC 822, SGSN 826, and GGSN 828.

Station 818 is a fixed transceiver station, and station 818 and BSC 820 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 818. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 802 within its cell. Communication protocols and parameters may vary between different networks. For example, one network may employ a different modulation scheme and operate at different frequencies than other networks.

For all mobile device's 802 registered with a network operator, permanent data (such as mobile device 802 user's profile) as well as temporary data (such as mobile device's 802 current location) are stored in HLR 832. In case of a voice call to mobile device 802, HLR 832 is queried to determine the current location of mobile device 802. A Visitor Location Register (VLR) of MSC 822 is responsible for a group of location areas and stores the data of those mobile devices that are currently in its area of responsibility. This includes parts of the permanent mobile device data that have been transmitted from HLR 832 to the VLR for faster access. However, the VLR of MSC 822 may also assign and store local data, such as temporary identifications. Optionally, the VLR of MSC 822 may be enhanced for more efficient co-ordination of GPRS and non-GPRS services and functionality (e.g. paging for circuit-switched calls which may be performed more efficiently via SGSN 826, and combined GPRS and non-GPRS location updates).

SGSN 826 is at the same hierarchical level as MSC 822 and keeps track of the individual locations of mobile devices. SGSN 826 also performs security functions and access control. GGSN 828 provides interworking with external packet-switched networks and is connected with SGSNs (such as SGSN 826) via an IP-based GPRS backbone network. SGSN 826 performs authentication and cipher setting procedures based on the same algorithms, keys, and criteria as in existing GSM. In conventional operation, cell selection may be performed autonomously by mobile device 802 or by the fixed transceiver equipment instructing mobile device 802 to select a particular cell. Mobile device 802 informs wireless network 804 when it reselects another cell or group of cells, known as a routing area.

In order to access GPRS services, mobile device 802 first makes its presence known to wireless network 804 by performing what is known as a GPRS "attach". This operation establishes a logical link between mobile device 802 and SGSN 826 and makes mobile device 802 available to receive, for example, pages via SGSN, notifications of incoming data, or SMS messages over GPRS. In order to send and receive GPRS data, mobile device 802 assists in activating the packet data address that it wants to use. This operation makes mobile device 802 known to GGSN 828; interworking with external data networks may thereafter commence. User data may be transferred transparently between mobile device 802 and the external data networks using, for example, encapsulation and tunneling. Data packets are equipped with GPRS-specific protocol information and transferred between mobile device 802 and GGSN 828.

Figure 9:
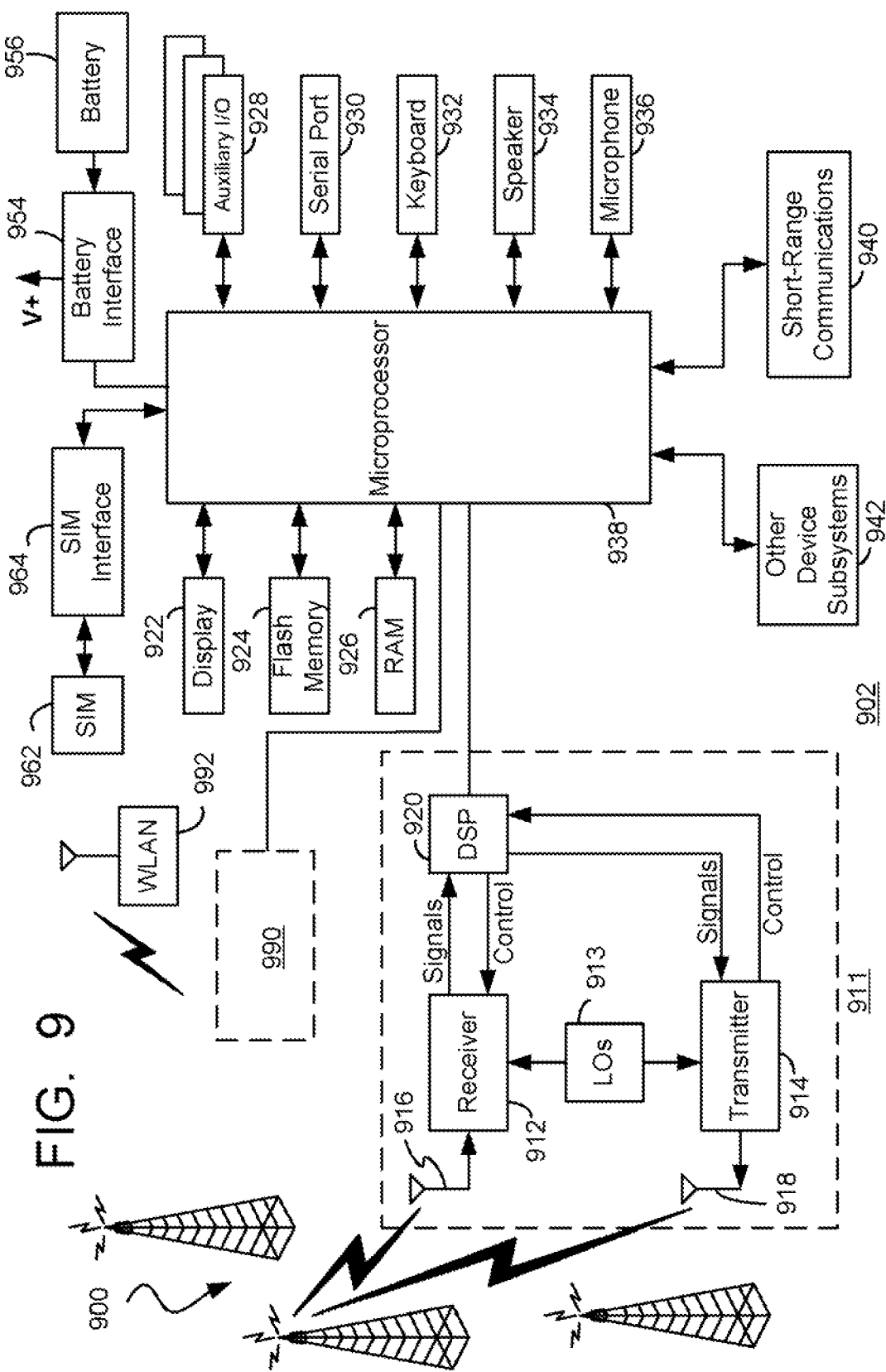
FIG. 9 is a schematic block diagram of a mobile device in a specific and preferred implementation as a mobile station.

FIG. 9 is a more detailed diagram of a preferred mobile device of FIG. 8, namely a mobile station 902. Mobile station 902 is preferably a two-way communication device having at least voice and advanced data communication capabilities, including the capability to communicate with other computer systems. Depending on the functionality provided by mobile station 902, it may be referred to as a data messaging device, a two-way pager, a cellular telephone with data messaging capabilities, a wireless Internet appliance, or a data communication device (with or without telephony capabilities).

As shown in FIG. 9, mobile station 902 is adapted to wirelessly communicate with WLAN 992. Also as shown, mobile station 902 is adapted to wirelessly communicate with cellular base station transceiver systems 900. For communication with cellular networks, mobile station 902 utilizes a communication subsystem 911. For communication with WLANs, mobile station 902 utilizes an additional communication subsystem 990 which has the same structural components as communication subsystem 911. With such configuration, mobile station 902 may be referred to as a "dual mode" mobile station. Although shown in FIG. 9 as having separate and independent subsystems, at least some portions or components of these otherwise different subsystems may be shared where possible.

Communication subsystem 911, which includes a receiver 912, a transmitter 914, and associated components, such as one or more (preferably embedded or internal) antenna elements 916 and 918, local oscillators (LOs) 913, and a processing module such as a digital signal processor (DSP) 920. Communication subsystem 911 is analogous to RF transceiver circuitry 808a and antenna 810a shown in FIG. 8. As will be apparent to those skilled in field of communications, particular design of communication subsystem 911 depends on the communication network in which mobile station 902 is intended to operate.

Mobile station 902 may send and receive communication signals over the cellular network after required network procedures have been completed. Signals received by antenna 916 through the network are input to receiver 912, which may perform such common receiver functions as signal amplification, frequency down conversion, filtering, channel selection, and like, and in example shown in FIG. 9, analog-to-digital (A/D) conversion. A/D conversion of a received signal allows more complex communication functions such as demodulation and decoding to be performed in DSP 920. In a similar manner, signals to be transmitted are processed, including modulation and encoding, for example, by DSP 920. These DSP-processed signals are input to transmitter 914 for digital-to-analog (D/A) conversion, frequency up conversion, filtering, amplification and transmission over communication network via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

For communications with a cellular network, network access is associated with a subscriber or user of mobile station 902, and therefore mobile station 902 requires a Subscriber Identity Module or "SIM" card 962 to be inserted in a SIM interface 964 in order to operate in the network. SIM 962 includes those features described in relation to FIG. 8. Mobile station 902 is a battery-powered device so it also includes a battery interface 954 for receiving one or more rechargeable batteries 956. Such a battery 956 provides electrical power to most if not all electrical circuitry in mobile station 902, and battery interface 954 provides for a mechanical and electrical connection for it. The battery interface 954 is coupled to a regulator (not shown) which provides power V+ to all of the circuitry.

Mobile station 902 includes a microprocessor 938 (which is one implementation of controller 806 of FIG. 8) which controls overall operation of mobile station 902. Communication functions, including at least data and voice communications, are performed through communication subsystem 911. Techniques of the present application are primarily performed through computer instructions which microprocessor 938 (and/or DSP 920) executes. Microprocessor 938 also interacts with additional device subsystems such as a display 922, a flash memory 924, a random access memory (RAM) 926, auxiliary input/output (I/O) subsystems 928, a serial port 930, a keyboard 932, a speaker 934, a microphone 936, a short-range communications subsystem 940, and any other device subsystems generally designated at 942. Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list. Operating system software used by microprocessor 938 is preferably stored in a persistent store such as flash memory 924, which may alternatively be a read-only memory (ROM) or similar storage element (not shown). Those skilled in the art will appreciate that the operating system, specific device applications, or parts thereof, may be temporarily loaded into a volatile store such as RAM 926.

Microprocessor 938, in addition to its operating system functions, preferably enables execution of software applications on mobile station 902. A predetermined set of applications which control basic device operations, including at least data and voice communication applications, will normally be installed on mobile station 902 during its manufacture. A preferred application which is loaded onto mobile station 902 may be a personal information manager (PIM) application having the ability to organize and manage data items relating to e-mail messages and voicemail messages, as well as calendar data. Naturally, one or more memory stores are available on mobile station 902 and SIM 952 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 902 with respect to such items. This is especially advantageous where the host computer system is the mobile station user's office computer system. Additional applications may also be loaded onto mobile station 902 through network, an auxiliary I/O subsystem 928, serial port 930, short-range communications subsystem 940, or any other suitable subsystem 942, and installed by a user in RAM 926 or preferably a non-volatile store (not shown) for execution by microprocessor 938.

In a data communication mode, a received signal such as a text message (e.g. a short message service or SMS message), an e-mail message, or web page download will be processed by communication subsystem 911 and input to microprocessor 938. Microprocessor 938 will preferably further process the signal for output to display 922 or alternatively to auxiliary I/O device 928. A user of mobile station 902 may also compose data items, such as e-mail messages, for example, using keyboard 932 in conjunction with display 922 and possibly auxiliary I/O device 928. Keyboard 932 is preferably a complete alphanumeric keyboard and/or telephone-type keypad. These composed items may be transmitted over a communication network through communication subsystem 911. For voice communications, the overall operation of mobile station 902 is substantially similar, except that the received signals would be output to speaker 934 and signals for transmission would be generated by microphone 936. Alternative voice or audio I/O subsystems, such as a voice message recording subsystem, may also be implemented on mobile station 902. Although voice or audio signal output is preferably accomplished primarily through speaker 934, display 922 may also be used to provide an indication of the identity of a calling party, duration of a voice call, or other voice call related information, as some examples.

Serial port 930 in FIG. 9 is normally implemented in a personal digital assistant (PDA)-type communication device for which synchronization with a user's desktop computer is a desirable, albeit optional, component. Serial port 930 enables a user to set preferences through an external device or software application and extends the capabilities of mobile station 902 by providing for information or software downloads to mobile station 902 other than through a wireless communication network. The alternate download path may, for example, be used to load an encryption key onto mobile station 902 through a direct and thus reliable and trusted connection to thereby provide secure device communication.

Short-range communications subsystem 940 of FIG. 9 is an additional optional component which provides for communication between mobile station 902 and different systems or devices, which need not necessarily be similar devices. For example, subsystem 940 may include an infrared device and associated circuits and components, or a Bluetooth™ communication module to provide for communication with similarly-enabled systems and devices. Bluetooth™ is a registered trademark of Bluetooth SIG, Inc.

Figure 10:
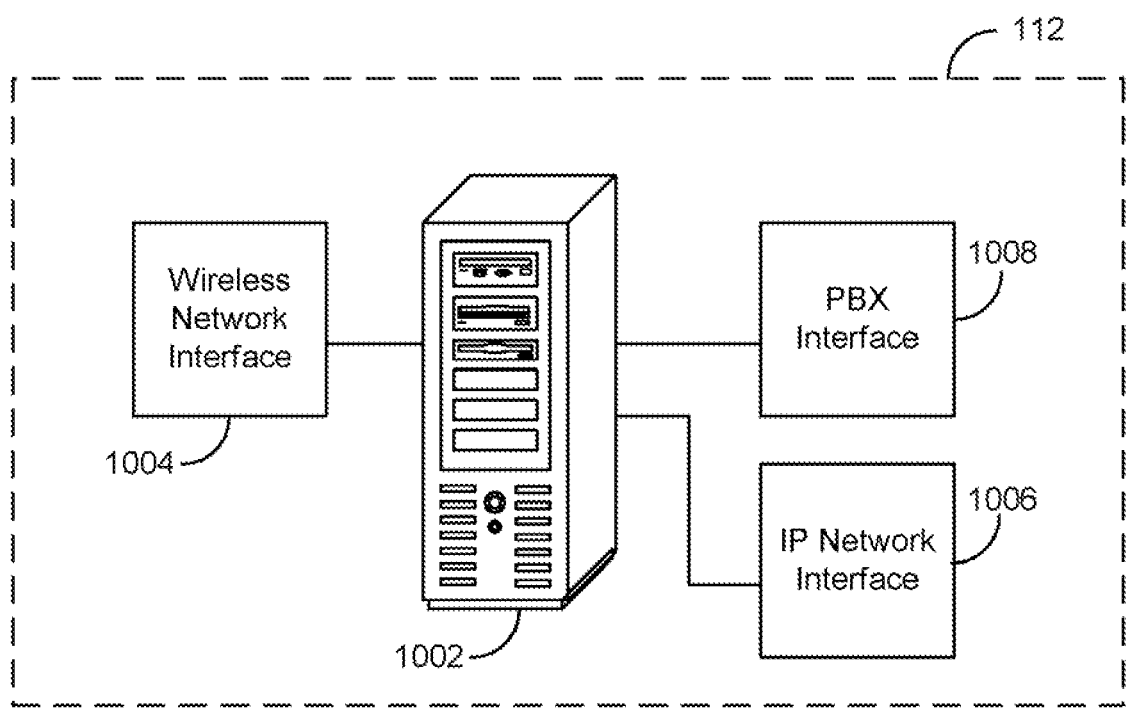
FIG. 10 is a block diagram illustration of pertinent components of call control equipment for use in the present application.

FIG. 10 is a block diagram illustration of pertinent components of call control equipment 112 for use in the present application. Call control equipment 112 of FIG. 10 includes a call control server 1002 which has a wireless network interface 1004, an IP network interface 1006, and a telephone landline network or public branch exchange (PBX) interface 1008. Call control server 112 is the entity which contains the primary logic for control and processing in accordance with the present application. The functionality of call control server 1002 is implemented using computer instructions stored in memory which are executed by one or more processors (e.g. a microprocessor) within server 1002. This functionality has been described previously in various embodiments described in relation to FIGS. 1-5 and 7 above. IP network interface 1006 of call control equipment 112 is used for communication with the 802.11 wireless network through an IP network (e.g. the Internet and/or Intranet), where conventional VoIP communication protocols may be utilized. Wireless network interface 1004 is used for communication with cellular network, where conventional cellular network protocols (e.g. SS7 signalling etc.) may be utilized for control and information communication. Finally, PBX interface 1002 is used for facilitating incoming or outgoing calls involving communication terminals over the landline telephone network. Note that, depending on the specific implementation, call control equipment 112 may only need only some of these interfaces 1004, 1006, and 1008.

Thus, methods and apparatus for providing a seamless switching of voice calls between different wireless networks have been described. One illustrative method for use by a mobile device of the present application includes the steps of maintaining voice communications for a voice call with a communication terminal through call control equipment, the voice call involving a traffic channel established between a first wireless network and the mobile device using a first transceiver portion which operates in accordance with the first wireless network; causing a connecting call to be established with the communication terminal through the call control equipment based on identifying a predetermined condition, the connecting call involving a traffic channel established between a second wireless network and the mobile device using a second transceiver portion which operates in accordance with the second wireless network; and after the connecting call is established, maintaining voice communications for the voice call over the traffic channel established between the second wireless network and the mobile device. In a preferred embodiment, one of the first and the second wireless networks is operative in accordance with a cellular telecommunications network and the other one of the first and the second wireless networks is operative in accordance with an 802.11 based wireless network. A computer program product of the present application includes a storage medium and computer instructions stored on the storage medium which are executable by one or more processors of the mobile device for performing the method as described. A mobile device of the present application includes one or more processors and one or more wireless transceivers coupled to the one or more processors, where the one or more wireless transceivers include a first transceiver portion operative in accordance with a first wireless network and a second transceiver portion operative in accordance with a second wireless network. The one or more processors of the mobile device are operative to perform the method as described.

An illustrative method for use by call control equipment of the present application includes the steps of facilitating an establishment of a voice call between a mobile device and a communication terminal through the call control equipment, the voice call involving a traffic channel established between a first wireless network and the mobile device; causing a connecting call to be established between the call control equipment and the mobile device during the voice call, the connecting call involving a traffic channel established between a second wireless network and the mobile device; and causing the connecting call to be connected with the voice call so that voice communications for the voice call are maintained over the traffic channel between the second wireless network and the mobile device. In a preferred embodiment, one of the first and the second wireless networks is operative in accordance with a cellular telecommunications network and the other one of the first and the second wireless networks is operative in accordance with an 802.11 based wireless network. A computer program product of the present application includes a storage medium and computer instructions stored on the storage medium which are executable by one or more processors of the call control equipment for performing the method as described. The call controller server of the present application includes one or more processors, memory coupled to the one or more processors, and computer instructions stored in the memory, where the computer instructions are executable by the one or more processors to perform the method as described.

The above-described embodiments of the present application are intended to be examples only. For example, one of the wireless networks may operate in accordance with Wi-MAX technology, which is based on the IEEE 802.16 Air Interface Standard for fixed wireless broadband access systems employing a point-to-multipoint (PMP) architecture. Those of skill in the art may effect alterations, modifications and variations to the particular embodiments without departing from the scope of the application.

What is claimed is:

1. A method for use by call control equipment in switching communication operations for a mobile communication device between first and second wireless networks, the method comprising the acts of:

receiving, at the call control equipment, a call request for a call from a calling party to a mobile communication device which operates in one of the first wireless network and the second wireless network, where the call request was initiated with use of a first identification number of the mobile communication device which identifies the mobile communication device in the first wireless network;

in response to receiving the call request when the mobile communication device is operating in the first wireless network:

causing the call to be connected through the call control equipment to the mobile communication device in the first wireless network with use of the first identification number of the mobile communication device which identifies the mobile communication device in the first wireless network;

after the call is connected, in response to a predetermined condition indicative of a switching of communication operation of the mobile communication device from the first wireless network to the second wireless network, causing a connecting call to be established with the mobile communication device in the second wireless network via the call control equipment;

in response to receiving the call request when the mobile communication device is operating in the second wireless network:

causing the call to be connected through the call control equipment to the mobile communication device in the second wireless network with use of a second identification number which identifies the mobile communication device in the second wireless network; and after the call is connected, in response to identifying a predetermined condition indicative of a switching of communication operation of the mobile communication device from the second wireless network to the first wireless network, causing a connecting call to be established with the mobile communication device in the first wireless network via the call equipment.

2. The method of claim 1, wherein one of the first and the second wireless networks is operative in accordance with a cellular telecommunications network and the other one of the first and the second wireless networks is operative in accordance with an 802.11 based wireless network.

3. The method of claim 1, wherein the first wireless network is operative in accordance with a first cellular telecommunications network and the second wireless network is operative in accordance with a second cellular telecommunications network different from the first cellular telecommunications network.

4. The method of claim 1, wherein the act of causing the connecting call to be established comprises:

initiating the connecting call with the mobile communication device.

5. The method of claim 1, wherein the act of causing the connecting call to be established further comprises:

receiving a network switching message from the mobile communication device; and initiating the connecting call with the mobile communication device in response to the network switching message from the mobile communication device.

6. The method of claim 1, wherein the act of causing the connecting call to be established further comprises:

receiving the connecting call from the mobile communication device; and causing the connecting call with the mobile communication device to be answered.

7. The method of claim 1, which is embodied in a computer program product comprising a computer readable medium and computer instructions stored in the computer readable medium for executing the acts of the method.

8. Call control equipment, comprising:

one or more processors;

memory coupled to the one or more processors;

computer instructions stored in the memory;

the computer instructions being executable by the one or more processors for:

receiving a call request for a call from a calling party to a mobile communication device which operates in one of a first wireless network and a second wireless network, where the call request was initiated with use of a first identification number of the mobile communication device which identifies the mobile communication device in the first wireless network;

in response to receiving the call request when the mobile communication device is operating in the first wireless network:

causing the call to be connected through the call control equipment to the mobile communication device in the first wireless network with use of the first identification number which identifies the mobile communication device in the first wireless network;

after the call is connected, in response to a predetermined condition indicative of a switching of communication operation of the mobile communication device from the first wireless network to the second wireless network, causing a connecting call to be established with the mobile communication device in the second wireless network via the call control equipment;

in response to receiving the call request when the mobile communication device is operating in the second wireless network:

causing the call to be connected through the call control equipment to the mobile communication device in the second wireless network with use of a second identification number which identifies the mobile communication device in the second wireless network; and after the call is connected, in response to identifying a predetermined condition indicative of a switching of communication operation of the mobile communication device from the second wireless network to the first wireless network, causing a connecting call to be established with the mobile communication device in the first wireless network via the call equipment.

9. The call control equipment of claim 8, wherein one of the first and the second wireless networks is operative in accordance with a cellular telecommunications network and the other one of the first and the second wireless networks is operative in accordance with an 802.11 based wireless network.

10. The call control equipment of claim 8, wherein the first wireless network is operative in accordance with a first cellular telecommunications network and the second wireless network is operative in accordance with a second cellular telecommunications network different from the first cellular telecommunications network.

11. The call control equipment of claim 8, further comprising:

merging the connecting call with the call.

12. The call control equipment of claim 8, wherein causing the connecting call to be established further comprises:

receiving a network switching message from the mobile communication device; and initiating the connecting call with the mobile communication device in response to the network switching message from the mobile communication device.

13. The call control equipment of claim 8, wherein causing the connecting call to be established further comprises:
   receiving the connecting call from the mobile communication device; and
   causing the connecting call with the mobile communication device to be answered.

14. The call control equipment of claim 8, wherein the step of causing the connecting call to be connected to the voice call comprises establishing a conference call type connection with the voice call.

15. The call control equipment of claim 8, wherein the call control equipment comprises a mobile branch exchange.

16. A communication system, comprising:
   a wireless local area network (WLAN);
   a cellular telecommunications network;
   a plurality of mobile communication devices operative for communications in the WLAN and the cellular telecommunications network;
   call control equipment which is operative to:
      receive a call request for a call from a calling party to a mobile communication device operating in one of the WLAN and the cellular telecommunications network, where the call request was initiated with use of a first identification number of the mobile communication device which identifies the mobile communication device in the WLAN;
      in response to receiving the call request when the mobile communication device is operating in the WLAN:
         cause the call to be connected through the call control equipment to the mobile communication device in the WLAN with use of the first identification number of the mobile communication device which identifies the mobile communication device in the WLAN;
         after the call is connected, in response to a predetermined condition indicative of a switching of communication operation of the mobile communication device from the WLAN to the cellular telecommunications network, cause a connecting call to be established with the mobile communication device in the cellular telecommunications network via the call control equipment;
      in response to receiving the call request when the mobile communication device is operating in the cellular telecommunications network:
         cause the call to be connected through the call control equipment to the mobile communication device in the cellular telecommunications network with use of a second identification number which identifies the mobile communication device in the cellular telecommunications network; and
         after the call is connected, in response to identifying a predetermined condition indicative of a switching of communication operation of the mobile communication device from the cellular telecommunications network to the WLAN, cause a connecting call to be established with the mobile communication device in the WLAN via the call equipment.

17. The communication system of claim 16, wherein causing the connecting call to be established comprises:
   initiating the connecting call with the mobile communication device.

18. The communication system of claim 16, wherein causing the connecting call to be established further comprises:
   receiving a network switching message from the mobile communication device; and
   initiating the connecting call with the mobile communication device in response to the network switching message from the mobile communication device.

19. The communication system of claim 16, wherein causing the connecting call to be established further comprises:
   receiving the connecting call from the mobile communication device; and
   causing the connecting call with the mobile communication device to be answered.

20. A communication system, comprising:
   a cellular telecommunications network;
   a wireless local area network (WLAN);
   a plurality of mobile communication devices operative for communications in the cellular telecommunications network and the WLAN;
   call control equipment which is operative to:
      receive a call request for a call from a calling party to a mobile communication device operating in one of the cellular telecommunications network and the WLAN, where the call request was initiated with use of a first identification number which identifies the mobile communication device in the cellular telecommunications network;
      in response to receiving the call request when the mobile communication device is operating in the cellular telecommunications network:
         cause the call to be connected through the call control equipment to the mobile communication device in the cellular telecommunications network with use of the first identification number which identifies the mobile communication device in the cellular telecommunications network;
         after the call is connected, in response to a predetermined condition indicative of a switching of communication operation of the mobile communication device from the cellular telecommunications network to the WLAN, cause a connecting call to be established with the mobile communication device in the WLAN via the call control equipment;
      in response to receiving the call request when the mobile communication device is operating in the WIAN:
         cause the call to be connected through the call control equipment to the mobile communication device in the WLAN with use of a second identification number which identifies the mobile communication device in the WLAN; and
         after the call is connected, in response to identifying a predetermined condition indicative of a switching of communication operation of the mobile communication device from the WLAN to the cellular telecommunications network, cause a connecting call to be established with the mobile communication device in the cellular telecommunications network via the call equipment.

* * * * *